United States Patent [19]

Yoshida et al.

[11] Patent Number: 5,108,977

[45] Date of Patent: Apr. 28, 1992

[54] CATALYST FOR CLEANING EXHAUST GAS

[75] Inventors: Kiyohide Yoshida; Satoshi Sumiya, both of Kumagaya; Takashi Ibusuki, Tsukuba; Akira Obuchi, Tsukuba; Hyogoro Aoyama, Tsukuba; Akiniko Ohi, Tsuchiura; Hideo Ohuchi, Tsukuba, all of Japan

[73] Assignees: Kabushiki Kaisha Riken; Kozo Izuka, Director-General of Agency of Industrial Science and Technology, both of Japan

[21] Appl. No.: 292,231

[22] Filed: Dec. 30, 1988

[51] Int. Cl.$^5$ .................. B01J 23/02; B01J 23/10; B01J 23/34; B01J 23/78

[52] U.S. Cl. ............................ 502/304; 502/303; 502/324; 502/330; 502/343; 502/344; 502/345

[58] Field of Search ............... 502/304, 303, 330, 324, 502/343, 344, 345; 423/215.5

[56] References Cited

U.S. PATENT DOCUMENTS

| | | | |
|---|---|---|---|
| 4,460,706 | 7/1984 | Imanari et al. | 502/330 X |
| 4,588,707 | 5/1986 | Domesle et al. | 502/304 X |
| 4,902,487 | 2/1990 | Cooper et al. | 423/215.5 |

FOREIGN PATENT DOCUMENTS

| | | | |
|---|---|---|---|
| 49-16695 | 2/1974 | Japan | 502/304 |
| 49-55585 | 5/1974 | Japan . | |
| 51-31691 | 3/1976 | Japan . | |
| 51-148665 | 12/1976 | Japan . | |
| 53-25291 | 3/1978 | Japan . | |
| 55-145520 | 11/1980 | Japan . | |
| 56-166925 | 12/1981 | Japan . | |
| 57-91726 | 6/1982 | Japan . | |
| 58-174236 | 10/1983 | Japan . | |
| 48-183945 | 10/1983 | Japan . | |
| 59-49825 | 3/1984 | Japan . | |
| 59-82944 | 5/1984 | Japan . | |
| 60-78640 | 5/1985 | Japan . | |
| 61-46246 | 3/1986 | Japan . | |
| 61-112715 | 5/1986 | Japan . | |
| 61-149221 | 7/1986 | Japan . | |
| 61-182412 | 8/1986 | Japan . | |
| 62-129146 | 6/1987 | Japan . | |
| 62-193633 | 8/1987 | Japan . | |
| 63-171623 | 8/1988 | Japan . | |
| 63-190645 | 8/1988 | Japan . | |
| 63-242347 | 10/1988 | Japan . | |

*Primary Examiner*—W. J. Shine
*Attorney, Agent, or Firm*—Brumbaugh, Graves, Donohue & Raymond

[57] ABSTRACT

An exhaust gas cleaner comprising a catalyst carrier on a heat-resistant filter, the catalyst comprising (a) one or more alkali metals, (b) one or more metals selected from the group consisting of Zn, Sn and transition metals excluding platinum-group metals, and (c) one or more rare earth metals, and a method of cleaning an exhaust gas with it. Alkali metals may be added to a fuel.

6 Claims, 4 Drawing Sheets

CATALYST FOR CLEANING EXHAUST GAS

BACKGROUND OF THE INVENTION

The present invention relates to an exhaust gas cleaner and a method of cleaning an exhaust gas by using this exhaust gas cleaner.

Recently, much attention has been being paid to fine particle materials contained in exhaust gases discharged from diesel engines, etc. particularly fine solid carbon particles and fine particles of liquid or solid high-molecular weight hydrocarbons, which cause environmental pollution. These fine particles, which may be called simply "fine carbon particles," have an average particle size of about 0.1–1 $\mu$m. Accordingly, they are floating in the air, and easily inhaled by breathing. It is confirmed by recent clinical tests that they contain carcinogens.

There are essentially two methods of removing these fine particles. One of them is a method of filtering an exhaust gas with a heat-resistant filter to trap fine carbon particles, and burning the fine carbon particles by a burner, an electric heater, etc. after a large pressure loss appears, to reuse the filter. Such filters may be metal wire meshes, ceramic foams, honeycomb ceramic monoliths, etc. The other is a method of using a heat-resistant filter carrying catalytic materials to filter and burn fine carbon particles, making the burning of fine carbon particles to regenerate the filter less frequent or making the regeneration of the filter unnecessary, thereby increasing the burning activity of the catalyst.

In addition, an attempt has been made to lower an ignition temperature of the fine carbon particles in these methods by increasing combustible components in the exhaust gas or by adding agents for promoting the oxidation of fine carbon particles to a fuel oil.

In the former method, however, the higher the efficiency of removing fine carbon particles, the faster the pressure loss takes place, resulting in more frequent regeneration steps. Thus, high level of regeneration is required, which means that it is economically disadvantageous.

On the other hand, in the latter method, it would be considered an excellent method, if there is a catalyst capable of maintaining a catalytic activity under the conditions of exhaust gases from diesel engines (gas compositions and temperatures). However, the exhaust gases from diesel engines have much lower temperatures than those from gasoline engines, and because the diesel engines use a gas oil as a fuel, their exhaust gases contain a large amount of $SO_2$. There has been proposed no method of burning fine carbon particles accumulated on catalysts under such exhaust gas conditions and regenerating them without causing any secondary pollution.

For instance, a combustion reaction of fine carbon particles can take place on a heat-resistant filter carrying only base metals at a temperature of about 350° C. or more. During most of the diesel engine operations, however, the exhaust gas temperatures are lower than the above temperature, causing no combustion reaction. As a result, fine carbon particles are trapped on the catalyst-carrying filter, and after the temperature increases over the above level, they start burning, enabling the regeneration of the filter. In this case, until the temperature of the filter reaches the above level, the pressure loss increases largely, making it more frequent to regenerate the filter by burning it with a burner, an electric heater, etc. Thus, this method is not practical one.

Alternatively, in the case of a catalyst containing precious metals, a combustion reaction of fine carbon particles easily takes place at a lower temperature, making slower the increase in the pressure loss. However, since the oxidation of $SO_2$ in the exhaust gas takes place simultaneously, extremely poisonous $SO_3$ or sulfuric acid mists are also generated, causing secondary pollution.

As described above, a good method has never been found to remove the fine carbon particles from the exhaust gases of diesel engines, etc. efficiently without oxidizing $SO_2$ to $SO_3$.

Another culprit of environmental pollution discharged form engines, etc. is nitrogen oxide simply represented by $NO_x$. $NO_x$ is usually removed from exhaust gases of engines, etc. by reducing it to $N_2$ with proper catalysts. However, in the case of exhaust gases from diesel engines, it is extremely difficult to remove nitrogen oxides, because exhaust gas temperature is relatively low, and because their oxygen concentration changes widely from several % to 13% or so.

OBJECT AND SUMMARY OF THE INVENTION

An object of the present invention, therefore, is to provide an exhaust gas cleaner which can efficiently remove not only fine carbon particles but also nitrogen oxides from an exhaust gas discharged from diesel engines, etc., which has a relatively low temperature and a widely changeable oxygen concentration.

Another object of the present invention is to provide a method of cleaning an exhaust gas by using such a cleaner.

The exhaust gas cleaner according to the present invention comprises a catalyst carried on a heat-resistant filter, the catalyst comprising (a) one or more alkali metals, (b) one or more metals selected from the group consisting of Zn, Sn and transition metals excluding platinum-group metals, and (c) one or more rare metals.

The method of cleaning an exhaust gas according to the present invention comprises using the above exhaust gas cleaner, and utilizing fine carbon particles in the exhaust gas as a reducing agent for reducing nitrogen oxides in the exhaust gas.

Another method of cleaning an exhaust gas according to the present invention comprises adding one or more alkali metal compounds to a fuel, using an exhaust gas cleaner comprising a catalyst carried on a heat-resistant filter, the catalyst comprising (a) one or more metals selected from the group consisting of Zn, Sn and transition metals excluding platinum-group metals, and (b) one or more rare metals, and utilizing fine carbon particles in the exhaust gas as a reducing agent for reducing nitrogen oxides in the exhaust gas.

DETAILED DESCRIPTION OF THE INVENTION

Figure 1:
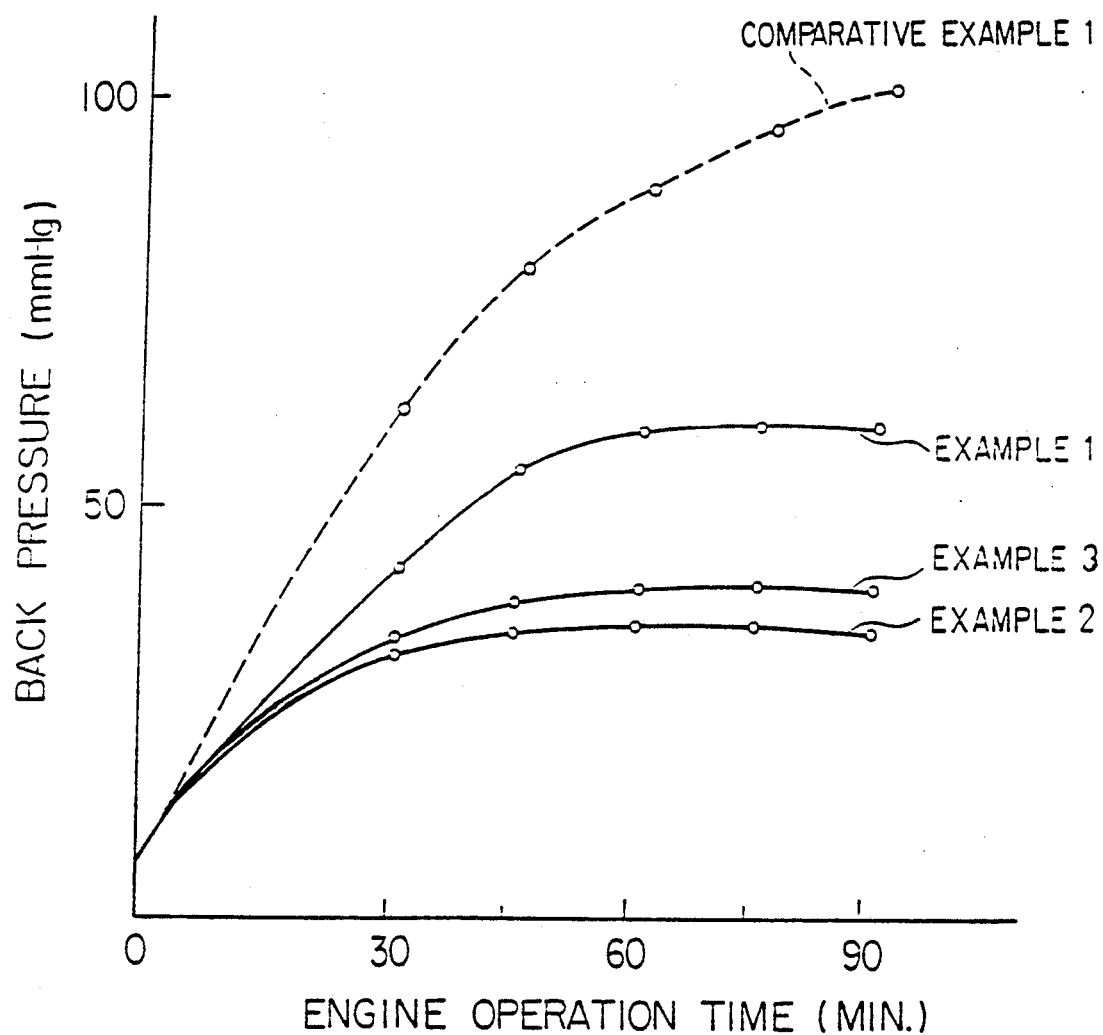
FIG. 1 is a graph showing the relations between engine operation time and back pressure in Examples 1-3 and Comparative Example 1.

It has been found that both of fine carbon particles and nitrogen oxides can be effectively removed from an exhaust gas by using a catalyst carried on a heat-resistant filter, the catalyst comprising (a) one or more alkali metals, (b) one or more metals selected from the group consisting of Zn, Sn and transition metals excluding platinum-group metals, and (c) one or more rare metals, and using fine carbon particles in the exhaust gas as a reducing agent for reducing nitrogen oxides.

In the exhaust gas cleaner according to the present invention, the existence of alkali metals, transition metals, etc., rare metals and fine carbon particles provides a synergistic effect to effectively reduce nitrogen oxides in the exhaust gas. Simultaneously, the fine carbon particles are consumed as a reducing agent to generate $CO_2$ gas. As a result, they are not accumulated on the heat-resistant filter unnecessarily, avoiding the large pressure loss of the filter. Accordingly, the regeneration of the filter by burning the fine carbon particles does not have to be carried out frequently.

In addition, as a result of intense research, it has been found that by using a catalyst carried on a heat-resistant filter, the catalyst comprising (a) one or more metals selected from the group consisting of Zn, Sn and transition metals excluding platinum-group metals, and (b) one or more rare metals, and by adding one or more alkali metal compounds to a fuel, both of nitrogen oxides and fine carbon particles can be removed effectively from an exhaust gas at a relatively low temperature by cooperation with fine carbon particles contained in the exhaust gas. In this case, alkali metal components added to the fuel, transition metals, etc. and rare metals carried on the heat-resistant filter, and the carbon fine particles cooperate with each other to effectively remove both nitrogen oxides and fine carbon particles from the exhaust gas.

With respect to the catalyst carried on the heat-resistant filter, its first component is one or more alkali metals, preferably, Li, Na and K. The alkali metal content in the catalyst is generally 0.1-20 weight % as a metal component based on the total weight of all metal components and fine ceramic powder carried on the heat-resistant filter. When it is less than 0.1 weight %, sufficient effect of reducing $NO_x$ to $N_2$ cannot be obtained, and when it exceeds 20 weight %, it cannot be well dispersed on the heat-resistant filter, and further increased catalytic activity cannot be obtained. The preferred amount of the alkali metal is 2-10 weight %.

Next, the catalyst contains one or more metals selected from the group consisting of Zn, Sn and transition metals excluding platinum-group metals. The term "transition metals" used herein means metals in Groups IVB, VB, VIB, VIIB, VIII and IB of the Periodic Table. Specifically, they include from Ti (atomic number 22) to Cu (atomic number 29), from Zr (atomic number 40) to Ag (atomic number 47), and from Hf (atomic number 72) to Au (atomic number 79). The platinum-group metals are Ru, Rh, Pd, Os, Ir and Pt. These platinum-group metals serve to decrease the ignition temperature of fine carbon particles, but they also contribute to the oxidation of $SO_2$ to $SO_3$. Since $SO_3$ is much more pollutive than $SO_2$, the oxidation of $SO_2$ should be avoided. In this sense, the platinum-group metals should not exist in the catalyst. The preferred metals are Co, Mn, Fe, Ni, Cu and Zn.

The contents of one or more metals selected from Zn, Sn and transition metals excluding platinum-group metals, Zn and Sn in the catalyst are 0.1-20 weight % as metal components in totality based on the total weight of all metal components and fine ceramic powder. When their total contents are less than 0.1 weight %, sufficient effect of reducing $NO_x$ to $N_2$ cannot be obtained, and when they exceed 20 weight %, they cannot be well dispersed on the heat-resistant filter, and further increased catalytic activity cannot be obtained. The preferred total amount of the transition metal, Zn and Sn is 2-10 weight %.

The term "rare metals" used herein means Sc, Y, lanthanoids and actinoids. The preferred rare metals are Ce, Th and La.

The rare metal content is generally 0.1-10 weight % as a metal component. When it is less than 0.1 weight %, sufficient effect of reducing $NO_x$ to $N_2$ cannot be obtained, and when it exceeds 10 weight %, it cannot be well dispersed on the heat-resistant filter, and further increased catalytic activity cannot be obtained. The preferred metal is 1-5 weight %.

When two or more metals selected from the above transition metals excluding platinum-group metals, Zn and Sn, and the rare elements are contained in the catalyst, especially when Ce—Mn, Th—Ni, etc. are used, the ignition temperature of fine carbon particles is lowered, resulting in effective burning (oxidation of the fine carbon particles). Accordingly, the reduction and removal of nitrogen oxides can also be conducted effectively.

Although catalyst components are described simply as metals in the above explanation, it should be noted that metals exist in the catalyst in the form of compounds, usually oxides.

The metal compounds having the above described metal composition may be directly supported by the heat-resistant filter, but for the purpose of increasing its surface area to which the catalyst components are attached, the heat-resistant filter is desirably covered with fine ceramic powder. Such fine ceramic may be made of the same ceramic materials as the heat-resistant filter, for instance, alumina, silica, titania, etc.

The heat-resistant filter should have necessary fine particle-trapping characteristics with permissibly small pressure loss. They are usually made of ceramic fibers, foams or monoliths of alumina, silica, titania, zirconia, silica-alumina, alumina-zirconia, alumina-titania, silica-titania, silica-zirconia, titania-zirconia, mullite, cordierite. etc., or metal wire meshes, etc., but it is not restricted to these materials.

The metal components in the catalyst carried on the heat-resistant filter via fine ceramic powder are 1-40 weight % in totality based on the total weight of the metal components and the fine ceramic powder. The preferred total amount of the metal components is 4-30 weight %. Incidentally, the fine ceramic powder is 0.5-30 weight % based on the weight of the heat-resistant filter.

The exhaust gas cleaner of the present invention is produced as follows.

After coating with fine ceramic powder, the heat-resistant filter is impregnated with alkali metals, transition metals, etc. and rare metals successively or simultaneously. These metal components used for impregnation may be in the form of water-soluble or water-dispersable compounds such as carbonates, nitrates, acetates, hydroxides, etc. The impregnation of the heat-resistant filter with such compounds are conducted by any conventional methods using aqueous solutions of the compounds. Alternatively, the transition metals and the alkali metals can be applied to the heat-resistant filter simultaneously by dipping it in an aqueous solution of alkali ferrocyanides, etc.

Incidentally, when the alkali metals are added to the fuel, the heat-resistant filter carries only the transition metals, etc. and the rare metals. In this case, the heat-resistant filter is impregnated with an aqueous solution of the transition metal compounds, etc. and the rare metal compounds.

After impregnation, the catalyst-carrying heat-resistant filter is dried and then burned at 600°-900° C. for 2-4 hours. By this burning treatment, metal compounds such metal acetates, etc. are converted to metal oxides.

The addition of the alkali metals to the fuel can be suitably conducted by using alkali metal compounds such as sodium naphthenate, potassium naphthenate, etc.

The present invention will be explained in further detail by the following Examples.

Examples 1-3, Comparative Example 1

A commercially available cordierite monolith based on magnesia, alumina and silica (bulk density: 0.37 g/cm$^3$, porosity: 86.0%, volume: 2.0 l) was impregnated with titania and then with an aqueous solution of potassium acetate. It was then impregnated with an aqueous solution of cerium acetate and manganese acetate. This catalyst-carrying ceramic monolith was dried at 150° C. for 4 hours and then heated at about 700° C. for 3 hours. The exhaust gas cleaner thus obtained is expressed by K/Ce/Mn (Example 1). In this cleaner, the catalyst components (as metal components) was 12 weight % based on the total weight of the catalyst components (as metal components) and titania fine powder, and the titania fine powder was in turn 10 weight % based on the cordierite monolith filter. In this catalyst, a weight ratio of K:Ce:Mn was 5:5:2.

Other samples having the following compositions were produced in the same manner as above:
Example 2: Na/Ce/Ni/Mn (2:5:5:2 by weight)
Example 3: Cs/Th/Cu/Zn (2:5:5:2 by weight )

In Examples 2 and 3, the catalyst components (as metals) was 14 weight % based on the total weight of the catalyst components (as metals) and titania fine powder.

By using each exhaust gas cleaner of Examples 1-3, a single cylinder diesel engine having a displacement of 510 cc was tested with respect to the change of back pressure to evaluate the performance of each exhaust gas cleaner. In this case, the engine was operated at 1500 rpm and a load of 90% and the exhaust gas temperature was 350° C. and had an oxygen concentration of 3%. FIG. 1 shows the back pressure changing with engine operation time.

Figure 2:
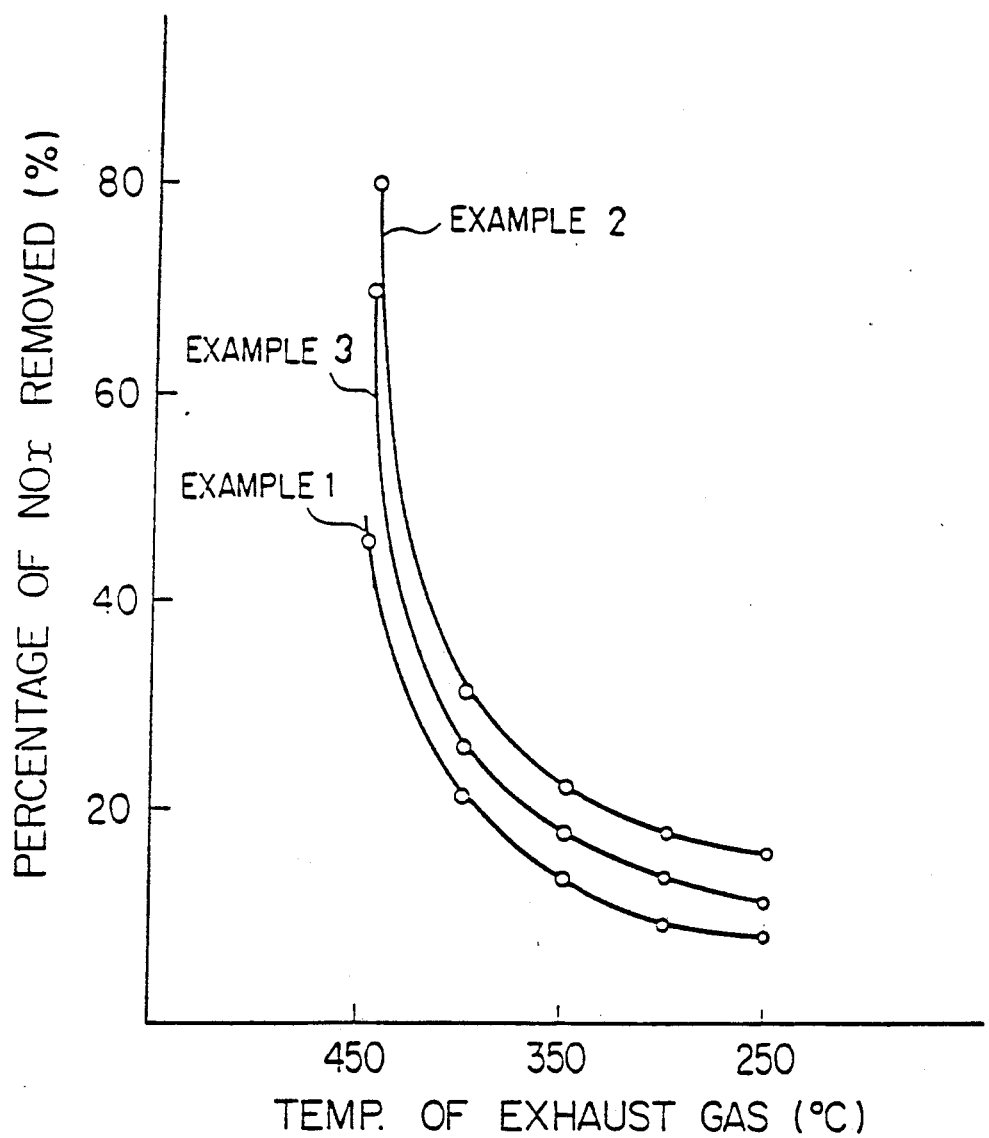
FIG. 2 is a graph showing the relations between exhaust gas temperatures at a time of conducting 60 minutes of engine operation and percentages of nitrogen oxides removed in Examples 1-3.

Next, with respect to each exhaust gas cleaner, the conversion of $NO_x$ to $N_2$ (ratio of $NO_x$ removed) was continuously measured at an exhaust gas temperature of 250°-450° C. by a chemical emission method. FIG. 2 shows the ratio of $NO_x$ removed after the lapse of 60 minutes of engine operation at each exhaust gas temperature.

For comparison, the same ceramic monolith as in Examples 1-3 was used without any catalyst as Comparative Example 1, and the same test was conducted. The result are also shown in FIG. 1.

It is clear from FIG. 1 that when the ceramic monolith of Comparative Example 1 was used, the fine carbon particles were accumulated on the filter, and that after 60 minutes of operation, the back pressure increased 6 times. On the other hand, the exhaust gas cleaners of Examples 1-3 were used, the back pressure increased at most 4 times or so after 60 minutes of operation, and any further increase of the back pressure was not observed thereafter. Thus, by using the exhaust gas cleaners of Examples 1-3, fine carbon particles in an exhaust gas of diesel engines can effectively be burned and removed.

In the case of an exhaust gas cleaner (ceramic monolith) of Comparative Example 1, the ratio of $NO_x$ removed from the exhaust gas was measured in the same manner as in Examples 1-3. As a result, it was found that substantially no $NO_x$ was removed.

On the other hand, as is clear from FIG. 2, in the case of using the exhaust gas cleaners of Examples 1-3, $NO_x$ was effectively removed, and the ratio of $NO_x$ removed was as high as 40% at an exhaust gas temperature of 450° C. And high $NO_x$ removal effects can be achieved even in an exhaust gas temperature as low as 250° C.

It is verified from FIGS. 1 and 2 that by using the exhaust gas cleaners of Examples 1-3, engine operation can be conducted for a long period of time while cleaning the exhaust gas effectively without conducting the regenerating operation of the filter.

Incidentally, in Examples 1-3, substantially no $SO_3$ or sulfuric acid mist was generated.

EXAMPLES 4-6, COMPARATIVE EXAMPLES 2 AND 3

The same cordierite monolith as in Examples 1-3 was used to carry fine titania powder, and each monolith was impregnated with an aqueous solution of cerium acetate, nickel acetate and manganese acetate. The ceramic monolith carrying these catalytic metals was dried at 150° C. for 4 hours and then heated at about 700° C. for 3 hours before use. The resulting exhaust gas cleaner (Example 4) is expressed by Ce/Ni/Mn. The catalyst components (as metal components) were 12 weight % based on the total weight of the catalyst components (as metal components) and titania fine powder, and a weight ratio of Ce:Ni:Mn in the catalyst was 5:5:2.

The following exhaust gas cleaners were produced in the same manner as above:
Example 5: Th/Cu/Zn (5:5:2 by weight)
Example 6: Ce/Sn (5:5 by weight)

In Examples 5 and 6, the catalyst components (as metal components) were 12 and 10 weight %, respectively, based on the total weight of the catalyst components (as metal components) and titania fine powder.

Figure 3:
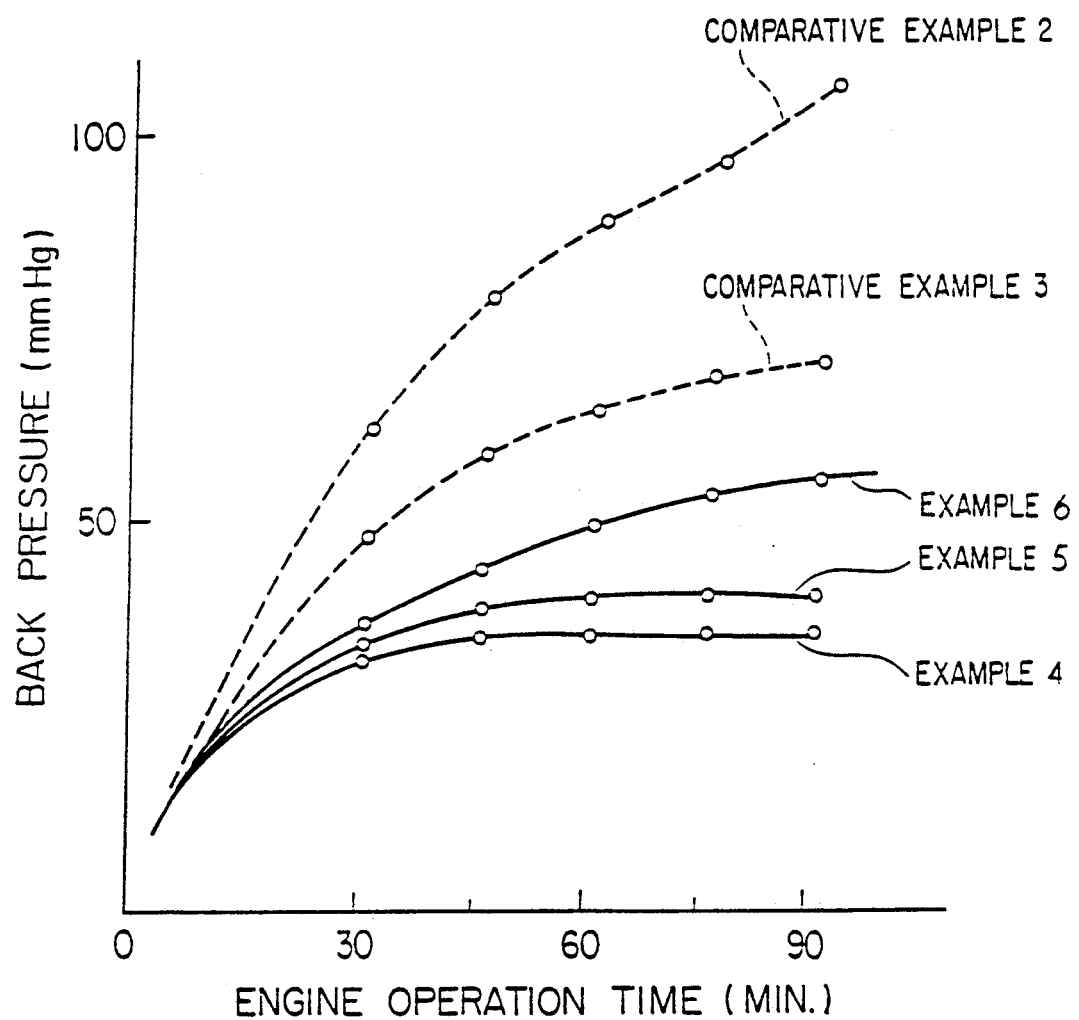
FIG. 3 is a graph showing the relations between engine operation time and back pressure in Examples 4-6 and Comparative Examples 2 and 3.

On the other hand, 100 ppm of potassium hydroxide was added to a fuel, and a single-cylinder diesel engine having a displacement of 510 cc was operated by using this fuel to evaluate the back pressure change when the exhaust gas cleaners of Examples 4-6 were used. FIG. 3 shows the back pressure change with engine operation time.

Next, with respect to each exhaust gas cleaner, the conversion of $NO_x$ to $N_2$ ($NO_x$ removal ratio) was measured under the same conditions as in Examples 1-3.

Figure 4:
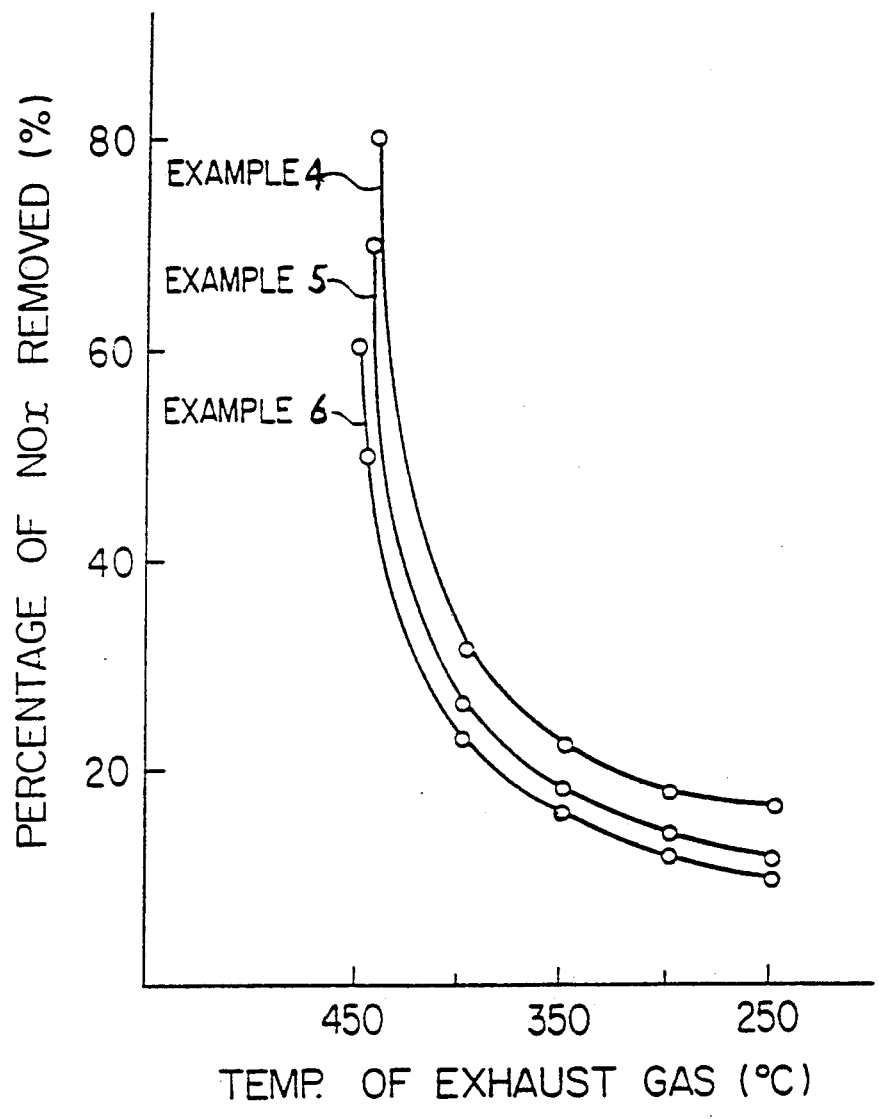
FIG. 4 is a graph showing the relations between exhaust gas temperatures at a time of conducting 60 minutes of engine operation and percentages of nitrogen oxides removed in Examples 4-6.

FIG. 4 shows the ratio of $NO_x$ removed after the lapse of 60 minutes of operation at each exhaust gas temperature.

For comparison, the same ceramic monolith as in Examples 4-6 was used without using any catalyst to evaluate the back pressure change in the same manner as in the above Examples (Comparative Example 2). In addition, without adding an alkali metal component to the fuel, the Ce/Ni/Mn exhaust gas cleaner was used to conduct the same test (Comparative Example 3). The results are also shown in FIG. 3.

As is clear from FIG. 3, in the case of ceramic monolith (exhaust gas cleaner) of Comparative Example 2, the fine carbon particles were accumulated on the filter, and after the lapse of 60 minutes of operation, the back pressure increased 6 times or more. In Comparative Example 3, its increase was about 5 times. On the other hand, in the case of the exhaust gas cleaners of Examples 4-6, the back pressure was at most two and a half times or so after the lapse of 60 minutes of operation. In addition, any further increase of the back pressure was observed thereafter. Thus, it was found that by using the exhaust gas cleaners of Examples 4-6, fine carbon particles can be effectively removed from the exhaust gas of the diesel engine.

Further, when the exhaust gas cleaners of Examples 4-6 used, a good $NO_x$ removal effect oan be achieved as is clear from FIG. 4. And the ratio of $NO_x$ removed was as high as 40% at an exhaust gas temperature of 450° C., and even at as low a temperature as 250° C., a good $NO_x$ removal effects can be achieved.

It is verified from FIGS. 3 and 4 that by using exhaust gas cleaners of Examples 4-6, engine operation can be conducted for a long period of time while cleaning the exhaust gas effectively without conducting the regenerating operation of the filter.

Incidentally, in Examples 4-6, substantially no $SO_3$ or sulfuric acid mist was generated.

The present invention has been explained by Examples, but it should be noted that any modifications are possible unless they deviate from the scope of the present invention defined by the claims attached hereto.

What is claimed is:

1. An exhaust gas cleaner comprising a catalyst carried on a heat-resistant filter, said filter consisting essentially of a material selected from the group consisting of ceramic fibers, foams, or monoliths, or metal wire meshes, and said catalyst consisting essentially of (a) one or more alkali metal oxides; (b) one or more metal oxides wherein the metals are selected from the group consisting of Co. Mn, Fe, Ni, Cu, Zn, and Sn; (c) one or more metal oxides wherein the metals are selected from the group consisting of La, Ce, and Th; and (d) a fine ceramic powder coated onto said heat-resistant filter, wherein said metal oxides are present in amounts effective to remove nitrogen oxides and fine carbon particles from an exhaust gas.

2. An exhaust gas cleaner as in claim 1 wherein the metal components in said metal oxides in (a) are in the amount 0.1 to 20% by weight based on the total weight of the catalyst, the metal components in said metal oxides in (b) are in the amount of 0.1-20% by weight based on the total weight of the catalyst, and the metal components in said metal oxides in (c) are in the amount of 0.1-10% by weight based on the total weight of the catalyst.

3. The exhaust gas cleaner according to claim 1, wherein said fine ceramic powder is in the amount of 0.5-30 weight % based on the weight of said heat-resistant filter, and the total amount of (a), (b), and (c) is 1-40 weight % of the total weight of the catalyst.

4. The exhaust gas cleaner according to claim 1, wherein the metal component in (b) is Ni and Mn, and the metal component in (c) is Ce.

5. The exhaust gas cleaner according to claim 1, wherein the metal component in (b) is Cu and Zn, and the metal component in (c) is Th.

6. The exhaust gas cleaner according to claim 1, wherein the metal component in (b) is Mn, and the metal component in (c) is Ce.

* * * * *